(12) United States Patent
Noguchi et al.

(10) Patent No.: US 9,784,137 B2
(45) Date of Patent: Oct. 10, 2017

(54) SUBCRITICAL PRESSURE HIGH-TEMPERATURE STEAM POWER PLANT AND SUBCRITICAL PRESSURE HIGH-TEMPERATURE VARIABLE PRESSURE OPERATION ONCE-THROUGH BOILER

(71) Applicant: Mitsubishi Hitachi Power Systems, Ltd., Nishi-ku, Yokohama, Kanagawa (JP)

(72) Inventors: Yoshiki Noguchi, Tokyo (JP); Toshihiko Sasaki, Tokyo (JP); Jun Koizumi, Tokyo (JP); Kazuhiko Saito, Tokyo (JP); Yuichi Yoshida, Tokyo (JP); Noboru Shinotsuka, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 487 days.

(21) Appl. No.: 14/019,802

(22) Filed: Sep. 6, 2013

(65) Prior Publication Data

US 2014/0116052 A1 May 1, 2014

(30) Foreign Application Priority Data

Oct. 25, 2012 (JP) .................. 2012-235471

(51) Int. Cl.
*F01K 7/22* (2006.01)
*F01K 7/38* (2006.01)
(Continued)

(52) U.S. Cl.
CPC ............ *F01K 13/006* (2013.01); *F01K 3/185* (2013.01); *F01K 7/22* (2013.01); *F01K 7/38* (2013.01);
(Continued)

(58) Field of Classification Search
CPC . F01K 7/22; F01K 7/38; F01K 13/006; F01K 25/103; F01K 3/185; F01K 13/02;
(Continued)

(56) References Cited

U.S. PATENT DOCUMENTS 2,964,910 A * 12/1960 Sonnefeld ............... F01K 19/02
60/653
3,081,748 A 3/1963 Koch
(Continued)

FOREIGN PATENT DOCUMENTS

CN 101285406 A 10/2008
GB 816765 7/1959
(Continued)

OTHER PUBLICATIONS

English Langauge Machine Translation of JP2007-101135.*
(Continued)

*Primary Examiner* — Mark Laurenzi
*Assistant Examiner* — Wesley Harris
(74) *Attorney, Agent, or Firm* — Crowell & Moring LLP

(57) ABSTRACT

A subcritical pressure high-temperature steam power plant includes a combustion boiler system, steam turbine generator system, and condensate and feedwater system and wherein the conditions of steam generated in the boiler system and supplied to the steam turbine generator system are subcritical pressure and high temperature (turbine inlet temperature of 593° C. or more).

5 Claims, 4 Drawing Sheets

(51) Int. Cl.
*F01K 13/00* (2006.01)
*F22B 29/06* (2006.01)
*F22B 29/12* (2006.01)
*F22B 35/10* (2006.01)
*F22G 5/00* (2006.01)
*F01K 25/10* (2006.01)
*F01K 3/18* (2006.01)
*F01K 13/02* (2006.01)

(52) U.S. Cl.
CPC ............ *F01K 13/02* (2013.01); *F01K 25/103* (2013.01); *F22B 29/06* (2013.01); *F22B 29/064* (2013.01); *F22B 29/12* (2013.01); *F22B 35/10* (2013.01); *F22G 5/00* (2013.01); Y10S 122/04 (2013.01)

(58) Field of Classification Search
CPC ........ F22B 29/06; F22B 29/064; F22B 29/12; F22B 35/10; F22G 5/00; Y10S 122/04
See application file for complete search history.

(56) References Cited

U.S. PATENT DOCUMENTS

| | | | |
|---|---|---|---|
| 5,390,631 A | 2/1995 | Albrecht | |
| 8,201,410 B2 | 6/2012 | Imano et al. | |
| 2006/0213457 A1* | 9/2006 | Upton | F01K 7/32 122/406.4 |
| 2007/0175413 A1* | 8/2007 | Becker | F22B 21/00 122/493 |
| 2008/0156236 A1 | 7/2008 | Ito et al. | |

FOREIGN PATENT DOCUMENTS

| | | | |
|---|---|---|---|
| JP | 61-76806 A | | 4/1986 |
| JP | 8-42805 A | | 2/1996 |
| JP | 9-53403 A | | 2/1997 |
| JP | 10-231708 A | | 9/1998 |
| JP | 2989520 B2 | | 12/1999 |
| JP | 2006-57929 A | | 3/2006 |
| JP | 2007101135 A | * | 4/2007 |
| JP | 2008-151471 A | | 7/2008 |
| JP | 2009-92351 A | | 4/2009 |
| JP | 2011-106790 A | | 6/2011 |
| JP | 2012-117680 A | | 6/2012 |
| JP | 2012-154322 | | 8/2016 |

OTHER PUBLICATIONS

Japanese Office Action issued in counterpart Japanese Patent Application No. 2012-235471 dated Jul. 21, 2015 with English translation (17 pages).
Korean Office Action issued in counterpart Korean Patent Application No. 10-2013-0106537 dated Jul. 15, 2014 with partial English translation (five pages).
Chinese Office Action issued in counterpart Chinese Application No. 201310403186.0 dated Jan. 6, 2015 with partial English translation (10 pages).
Russian Office Action issued in counterpart Russian Application No. 2013140948 dated Jan. 23, 2015 with English translation (nine pages).
TBWES, 'Subcritical Boilers', Thermal Babcock & Wilcox Energy Solutions, Mar. 13, 2012 (Mar. 13, 2012), XP055103435, retrieved from the Internet @ URL:https://web.archive.org/web/20120313150920/http://www.tbwes.com/products/subcritial-boilers/ [retrieved from the Internet on Feb. 20, 2014] (1 pg.).
Asthana, Vivek and Panigrahi, P.K., "Performance of Power Plants With High Temperature Conditions at Sub-Critical Pressures", 2008,XP055103476, 5th European Thermal-Science Conference, The Netherlands, 2008. retrieved from the Internet on Feb. 20, 2014 @ http://eurotherm2008.tue.nl/proceedings_eurotherm2008/papers/thermal_processing/thp_8.pdf,[ 8 pages].
"Radiant Boilers for Reliable Subcritical Steam Applications," Babcock & Wilcox Power Generation Group, 2008, XP055103502, retrieved from the Internet on Feb. 20, 2014 http://www.babcock.com/library/Documents/e1013193.pdf. [12 pages].
European Search Report and Annex to the European Search Report in EP13183065.5-1610, dated Feb. 28, 2014 [9 pages].
Hitachi Hyoron Completion of the Latest 1,000 MW Coal Fired Boiler, Feb. 1998, pp. 61-66, vol. 80, No. 2. (explanation of the relevance is satisfied by the discussion in the specification).
Japanese Office Action dated Nov. 29, 2016 with English-language translation (8 pages).
Japanese Office Action dated Jul. 11, 2017, with English language translation (11 pages) issued in counterpart Japanese Patent Application No. 2016-029728.
Journal of the Thermal and Nuclear Power, Thermal and Nuclear Power Engineering Society of Japan, vol. 56 No. 4 (Apr. 2005), pp. 56-71.

* cited by examiner

SUBCRITICAL PRESSURE HIGH-TEMPERATURE STEAM POWER PLANT AND SUBCRITICAL PRESSURE HIGH-TEMPERATURE VARIABLE PRESSURE OPERATION ONCE-THROUGH BOILER

CLAIM OF PRIORITY

The present application claims priority from Japanese Patent application serial no. 2012-235471, filed on Oct. 25, 2012, the content of which is hereby incorporated by reference into this application.

TECHNICAL FIELD

The present invention relates to subcritical pressure high-temperature steam power plants and subcritical pressure high-temperature variable pressure operation once-through boilers and more particularly to subcritical pressure high-temperature steam power plants which have a small-to-medium power generation capacity and subcritical pressure high-temperature variable pressure operation once-through boilers for use therein.

BACKGROUND ART

In order to reduce $CO_2$ emissions from thermal power plants comprised of boilers and steam turbines, efforts have been continued to improve the efficiency of the thermal power plants by increasing the pressure and temperature as steam conditions. Nowadays, in Japan, mainly coal fired power plants of the 0.6-to-1 million kW class employ the following steam conditions for their commercial systems: a main steam pressure range from 24.1 to 25.0 MPa (supercritical pressure), a main steam temperature range from 593 to 600° C., a reheated steam temperature range from 593 to 620° C. (for example, see Non-patent Literature 1, "HITACHI HYORON", Vol. 80, No. 2, published in February 1998, pp. 61-66). Generally, steam pressures of 24.1 MPa (3500 psi) or more and steam temperatures of 593° C. (1,100° F.) or more are called ultra-supercritical (USC) pressure conditions. The commercialization of high-temperature materials for boiler tubes, valves and turbines which are excellent in high-temperature strength and corrosion resistance has contributed largely to the practical use of such ultra-supercritical pressure steam conditions (steam temperatures of 593° C. or more).

On the other hand, small-to-medium capacity thermal power plants in which the power output of a single generator is 0.4 million kW or less have employed steam conditions that the main steam pressure remains subcritical and the maximum turbine inlet steam temperature is 566° C.

CITATION LIST

Non-Patent Literature

[Non-patent Literature 1]
"HITACHI HYORON", Vol. 80, No. 2, published in February 1998, pp. 61-66

SUMMARY OF INVENTION

Technical Problem

Among small-to-medium capacity thermal power plants, there are many coal fired power plants which have been run for many years and it is expected that replacement or renovation of many such existing plants will be made. In replacement or renovation of such existing thermal power plants, efficiency improvement is particularly desirable from the viewpoint of $CO_2$ emission reduction. Also, when a new small-to-medium capacity thermal power plant is constructed, improved efficiency is desirable.

Supercritical pressure coal fired thermal power plants are more efficient and more environmentally friendly than subcritical pressure coal fired thermal power plants. As mentioned above, as high-temperature materials have become commercially available, large-capacity thermal power plants which are run under steam conditions of supercritical pressure and 593° C. or more have been commercialized. So, if such steam conditions of supercritical pressure and 593° C. or more are applied to small-to-medium capacity thermal power plants, efficiency is expected to improve.

However, according to the study by the present inventors, it has been found that even if supercritical pressure steam conditions are applied to small-to-medium capacity thermal power plants, efficiency will not be improved as expected. More specifically, if the main steam pressure is increased to supercritical pressure or more in a small-to-medium capacity plant, the specific volume decreases with pressure increase approximately in accordance with the thermodynamic law of ideal gas, (pressure)×(volume)÷(temperature)=constant, and as a consequence, due to limitations on the height and shape of the high-pressure turbine initial blade cascade, it is difficult for the plant to provide high efficiency like a large capacity plant. For example, a decreased steam volume would make it necessary to shorten the blades of the high-pressure turbine initial cascade, which would increase turbine internal loss and make it impossible to achieve efficiency improvement worth the cost of the equipment for supercritical pressure.

An object of the present invention is to provide a thermal power plant with a small-to-medium power generation capacity which can improve efficiency effectively and a boiler for use therein.

Solution to Problem

The present invention is characterized in that the conditions of steam which is generated in a boiler and supplied to a steam turbine are subcritical pressure and high temperature (turbine inlet temperature of 593° C. or more).

Advantageous Effects of Invention

According to the present invention, the efficiency of a thermal power plant with a small-to-medium power generation capacity can be improved effectively.

The above and further objects and novel features of the invention will more fully appear from the following description of embodiments of the invention.

DESCRIPTION OF EMBODIMENTS

Next, the preferred embodiments of the present invention will be described referring to drawings.

Although supercritical pressure steam power generation is more efficient and more environmentally friendly than subcritical pressure steam power generation, as mentioned above it has been found that in thermal power plants with a small-to-medium power generation capacity for which the present invention is intended, even the introduction of supercritical pressure steam conditions (rated steam conditions) does not improve efficiency as expected. Therefore, in the present invention, instead of using supercritical pressure, the steam pressure is made to remain subcritical and higher temperature (turbine inlet temperature of 593° C. or more) is used to improve efficiency effectively.

In the present invention, subcritical pressure high-temperature steam (turbine inlet temperature of 593° C. or more) is supplied to a steam turbine to generate power and a thermal power plant which uses steam with such conditions is called a subcritical pressure high-temperature steam power plant and a boiler which generates such steam is called a subcritical pressure high-temperature variable pressure operation once-through boiler. Specifically, a thermal power plant with a small-to-medium power generation capacity for which the present invention is intended is a thermal power plant in which the power output (rated output) of a single power generator (one power generator unit) is in a range of 0.1 to 0.4 million kW. In a plant with a power generation capacity of more than 0.4 million kW, efficiency will be improved effectively under steam conditions of 593° C. or more and supercritical pressure and there is virtually no need to keep the pressure steam subcritical. On the other hand, in a plant with a power generation capacity of less than 0.1 million kW, the rate of heat absorption in the furnace (stated later) would be too high and in order to increase the steam temperature, the boiler structure must be more complicated and costly.

Figure 1:
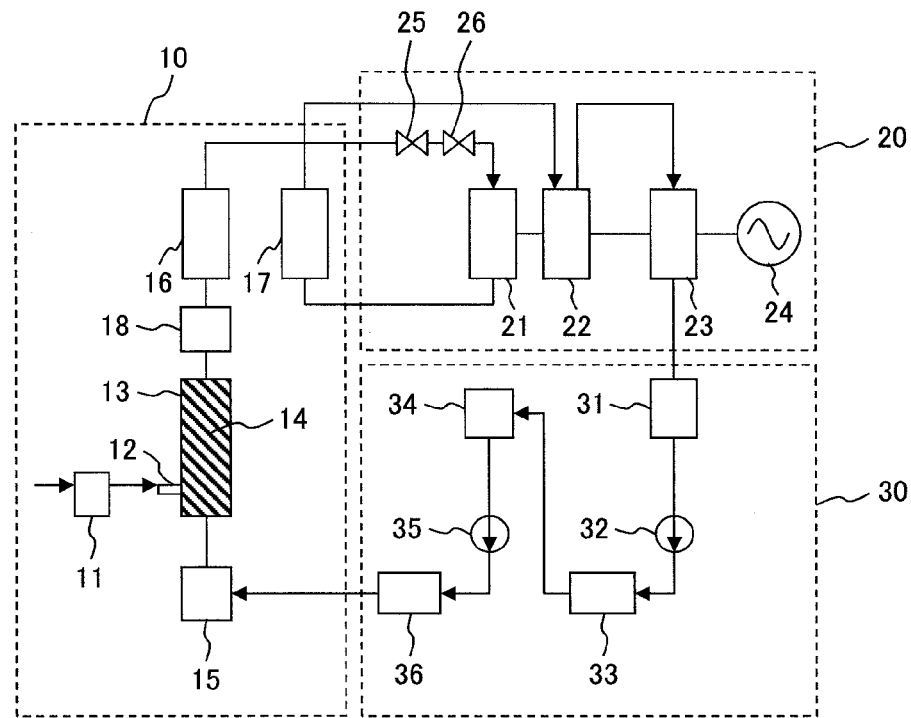
FIG. 1 is a schematic diagram showing the system configuration of a subcritical pressure high-temperature steam power plant according to a first embodiment of the present invention.

FIG. 1 is a schematic diagram showing the system configuration of a subcritical pressure high-temperature steam power plant according to an embodiment of the present invention. The subcritical pressure high-temperature steam power plant includes a combustion boiler system 10, steam turbine generator system 20, and condensate and feedwater system 30. In this embodiment, the thermal power plant uses a single generator.

The combustion boiler system 10 includes a coal mill 11, burner 12, furnace 13, spiral water wall tube 14, fuel economizer 15, high-temperature superheater 16, high-temperature reheater 17, and steam separator 18. The boiler system will be described in detail later.

The steam turbine generator system 20 includes a high-temperature high-pressure turbine 21, high-temperature reheat intermediate-pressure turbine 22, low-pressure turbine 23, and generator 24. Reference signs 25 and 26 denote a main steam stop valve and a main steam control valve respectively.

The condensate and feedwater system 30 includes a condenser 31, condensate pump 32, low-pressure feedwater heater 33, deaerator 34, water supply pump 35, and high-pressure feedwater heater 36.

Fuel coal is pulverized by the coal mill 11 into powdered coal, which is then supplied to the burners 12 disposed in the furnace 13 to burn with oxygen in the air and generate heat. The burners 12 are installed and arranged so as to minimize temperature distribution unevenness in the furnace 13 and differences in the metal temperature of the spiral water wall tube 14. For example, burners 12 which correspond to each coal mill 11 are located in a way to face each other and burners 12 are arranged in a row on both sides of the furnace 13 to burn powdered coal as fuel.

While coal is mainly used as fuel, the boiler system may be designed so as to enable mixed combustion of oil, biomass or by-product gas of steel making process with coal in the furnace 13. For example, if biomass is used, biomass is supplied to the coal mill 11 and supplied with coal to the burner 12. If by-product gas is used, a special burner for by-product gas is installed. An oil fired burner for starting is also provided in the furnace 13 (not shown in the figure).

The radiation heat and convection heat generated by combustion is used to heat (evaporate or superheat) the pressurized water in the spiral water wall tube 14 which constitutes the water wall of the furnace 13. The steam (steam at the furnace outlet) from the spiral water wall tube 14 is guided through the steam separator 18 and passed as superheated steam to the high-temperature superheater 16.

The high-temperature superheater 16 supplies superheated steam (subcritical pressure superheated steam) of 593° C. or more (inlet temperature of the high-temperature high-pressure turbine) to the high-temperature high-pressure turbine 21. The high-temperature superheated steam at subcritical pressure and 593° C. or more drives the high-temperature high-pressure turbine 21. The high-pressure turbine exhaust steam which has been used in the high-temperature high-pressure turbine 21, the pressure and temperature of which have decreased, is guided to the high-temperature repeater 17 where it is reheated to 593° C. or more. The reheated high-temperature steam of 593° C. or more (subcritical pressure superheated steam) is guided to the high-temperature reheat intermediate-pressure turbine 22 to drive the high-temperature reheat intermediate-pressure turbine 22. The exhaust steam which has been used in the high-temperature reheat intermediate-pressure turbine 22 is guided to the low-pressure turbine 23 to drive the low-pressure turbine 23. The generator 24 is driven by the power of the high-temperature high-pressure turbine 21, high-temperature reheat intermediate-pressure turbine 22, and low-pressure turbine 23 to generate power.

The exhaust steam from the low-pressure turbine 23 is guided to the condensate and feedwater system 30. In the condensate and feedwater system 30, the condenser 31 cools the exhaust steam from the low-pressure turbine 23, collects the latent heat of the steam and condenses the steam into water. The condensed water is pressurized by the condensate pump 32, heated by the low-pressure feedwater heater 33 and deaerated by the deaerator 34 to become feedwater. The feedwater is pressurized by the water supply pump 35, heated by the high-pressure feedwater heater 36, then supplied as high-temperature pressurized water to the fuel economizer 15. In the fuel economizer 15, the feedwater going to enter the spiral water wall tube 14 is preheated by the boiler exhaust gas.

As mentioned above, when high-temperature materials for boiler pipes, valves and turbines have been commercialized, supercritical pressure steam conditions (turbine inlet temperature 593° C. or more) have become applicable on a commercial basis. Therefore, in a thermal power plant with a small-to-medium power generation capacity (0.1 to 0.4 million kW), the steam temperature can be easily increased (to turbine inlet temperature 593° C. or more) by utilizing the technique of high-temperature materials for supercritical pressure.

It is known that in the combined cycle system in which steam is generated by an exhaust gas boiler (a heat recovery steam generator) using gas turbine exhaust gas and power is generated by both a gas turbine and a steam turbine, high-pressure main steam at subcritical pressure in the exhaust gas boiler is brought to 600° C. by the once-through Benson boiler method. However, this is a steam generation process based on an exhaust heat collection system in which a heat exchanger is heated using the exhaust gas after driving the gas turbine, in order to generate steam and this technique is different from the technique of a combustion boiler using coal or the like. In other words, from the viewpoints of the temperature and calorific value of exhaust gas, basically the exhaust heat collection system is not a technique premised on the use of supercritical pressure; namely this system does not intentionally elect to use subcritical pressure.

Next, the boiler which is used in the subcritical pressure high-temperature steam power plant according to the present invention will be explained in detail.

In the past, generally a drum boiler has been used in a subcritical pressure thermal power plant with a small-to-medium capacity. In a drum boiler in which saturated vapor is generated by a steam generating tube and a drum and superheated steam is generated by a superheater, the steam temperature at the drum outlet is primarily determined to be equal to the saturated steam temperature at the drum operating pressure. This means that the steam temperature can be increased to 593° C. only by increasing the superheater heat transfer area or increasing the superheater inlet gas temperature. Particularly in the case of a coal fired combustion boiler, there are many engineering difficulties and the technique of attaining the above steam temperature has not been commercialized yet. More specifically, in drum boilers used in existing subcritical pressure thermal power plants, the maximum steam turbine inlet temperature after the superheater/reheater is 566° C./566° C.

On the other hand, in the once-through boiler (variable pressure operation once-through boiler) which is used in a supercritical pressure thermal power plant, in a supercritical pressure state in the high load operating range, feedwater is continuously turned into superheated steam without a boiling phenomenon and in a subcritical pressure state in the partial load operating range by variable pressure operation, saturated and superheated steam can be generated without a pressure drum by using the nucleate boiling phenomenon in the steam generating tube effectively (a steam separator is provided for transitional operation for start and stop).

In the present invention, a once-through boiler is used instead of a drum boiler in order to ensure that the steam turbine inlet temperature after the superheater/reheater is 593° C./593° C. or more at subcritical pressure.

For the introduction of a variable pressure operation once-through boiler with a small-to-medium capacity (in particular a coal fired variable pressure operation once-through boiler), the problem is that as the plant power output is smaller, the rate of heat absorption of the furnace is larger. With an increase in the heat absorption of the furnace, the following problems arise:

(1) The gas temperature at the furnace outlet tends to drop and it becomes necessary to take measures to increase the heat absorption of the superheater.

(2) The rise in the furnace metal temperature with increase in the heat absorption of the furnace must be within a permissible range.

(3) As the heat absorption of the furnace increases, the temperature is effectively increased in the superheater but superheating may be excessively done in the air-water separator.

(4) For subcritical pressure once-through operation in the full load operation range of the plant, it is necessary to keep the nucleate boiling condition all the time to prevent film boiling.

For example, in order to solve the problem of gas temperature drop at the furnace outlet, a special means to increase the gas temperature at the furnace outlet or an increase in the superheater heat transfer area may be required. In this case, care must be taken not to cause a significant increase in the heat transfer area, volume, weight or the like of the boiler plant, resulting in cost rise. Particularly in the case of plant construction by replacement or renovation of an existing thermal power plant (drum boiler) with a small-to-medium capacity, it is desirable that the installation space and weight be equal to or smaller than those of the existing drum boiler.

Therefore, the present invention employs a spiral once-through boiler as used in a supercritical pressure variable pressure operation once-through boiler. The spiral once-through boiler uses a spiral water wall tube as the water wall tube of the furnace. In a large capacity supercritical pressure thermal power plant, the plant is run at partial load through variable pressure operation and because the steam pressure becomes subcritical at partial load, a spiral water wall tube is used in order to prevent transition from the nucleate boiling condition to the film boiling condition. Generally, the inclination of the spiral water wall tube (the angle of the spiral water wall tube as seen horizontally, or spiral angle) is about 25 degrees.

In the present invention, for subcritical pressure once-through operation of the plant in the full load operation range, it is necessary to keep the nucleate boiling condition all the time and prevent film boiling. In other words, it is necessary to keep the flow velocity not less than the minimum flow velocity required to keep the nucleate boiling condition and prevent film boiling in the full load operation range of the plant for stable evaporation control. In the present invention, in addition to the above, due to the fact that in a smaller capacity boiler, the proportion of the water tube which constitutes the furnace water wall is larger, it is necessary to solve the problem of in-tube flow velocity drop. Thus, according to the study by the present inventors, in a subcritical pressure high-temperature spiral once-through boiler with a small-to-medium capacity, the inclination of the spiral water wall tube must be smaller than the inclination of the spiral water wall tube in the once-through boiler of a supercritical pressure thermal power plant (by decreasing the inclination angle of the spiral water wall tube, the proportion of the tube constituting the furnace water wall can be decreased and the flow velocity in the spiral water wall tube can be increased).

However, since a decrease in the inclination angle of the spiral water wall tube leads to the tendency toward increased stress in the vertical direction, from the viewpoint of spiral tube water wall strength it seems difficult to decrease the inclination angle. In this respect, paying attention to the fact that the steam pressure is subcritical, the present inventors conducted various experiments and have found that even when the inclination of the spiral water wall tube is small, sufficient strength is obtained by decreasing the weight (for example, the tube wall thickness at subcritical pressure can be smaller than at supercritical pressure) and lowering the pressure in the spiral water wall tube.

For this reason, in the present invention, the inclination of the spiral water wall tube is smaller than the inclination (about 25 degrees) of the spiral water wall tube in the variable pressure operation once-through boiler of the supercritical pressure thermal power plant. Specifically, the angle of the spiral water wall tube is within a range of 10 to 20 degrees as seen horizontally. This angle range of the spiral water wall tube would not be derived without the above finding by the present inventors. According to the study by the present inventors, it has been confirmed that in an example of a coal fired spiral variable pressure operation once-through boiler in a plant with an output of 150 to 250 MW, when the angle of the spiral water wall tube as seen horizontally is within the range of 10 to 20 degrees, film boiling does not occur and flow stability is ensured. Also, improvement in water wall metal reliability has been confirmed. Furthermore, it has been confirmed that the strength of the water wall structure is sufficient when the angle is within this range.

Figure 2:
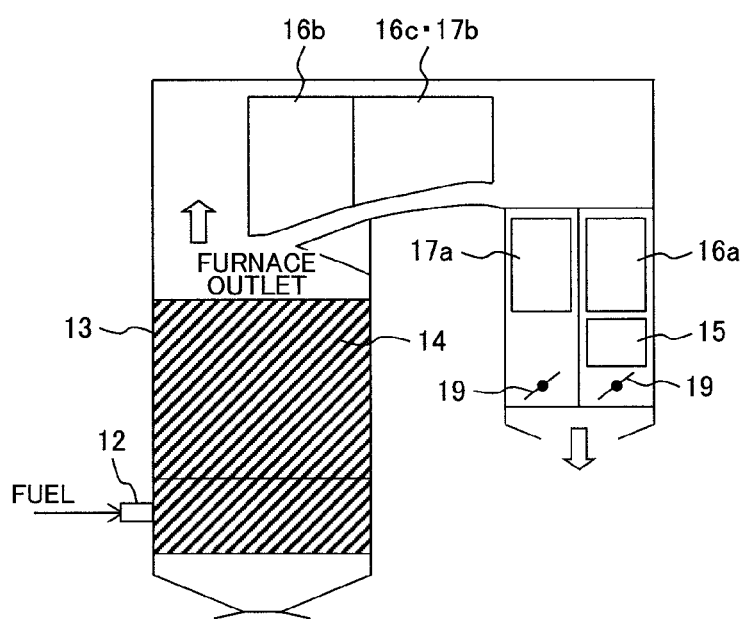
FIG. 2 is a sectional view showing the general boiler structure according to the first embodiment of the invention.

FIG. 2 schematically shows the boiler structure according to the embodiment of the present invention. The area of the spiral water wall tube 14 in the boiler furnace 13 is roughly indicated here. The hatching in the figure represents the furnace which uses a spiral water wall tube, including the burner section 12 under the furnace 13. The spiral water wall tube 14 constituting the water wall of the furnace 13 is inclined at an angle as mentioned above so as to prevent film boiling in the spiral water wall tube 14 to generate subcritical pressure steam (water critical pressure is about 22.0 MPa) stably and ensure high flow velocity and stable operation.

This embodiment uses a steam temperature controlled boiler of the parallel damper type which does not involve gas recirculation. The high-temperature superheater 16 includes a primary superheater 16a, secondary superheater 16b, and tertiary superheater 16c. The high-temperature reheater 17 includes a primary reheater 17a and secondary reheater 17b. The primary superheater 16a and primary reheater 17a are located in a parallel damper and the secondary superheater 16b, tertiary superheater 16c and secondary reheater 17b are located in the high temperature section of combustion exhaust gas at the outlet of the furnace 13. This arrangement may be considered as reasonable even in the conventional boiler design and layout but it is just an example and the present invention is not limited to this arrangement. In the secondary superheater 16b and tertiary superheater 16c of the high-temperature superheater 16, the steam is heated by high temperature combustion exhaust gas at the furnace outlet to generate steam of 593° C. or more at subcritical pressure. In the secondary reheater 17b of the high-temperature reheater 17, the steam is heated by high temperature combustion exhaust gas at the furnace outlet to generate steam of 593° C. or more at subcritical pressure.

In the parallel damper steam temperature control method, by opening or closing the gas distribution dampers 19, for example, the flow rate of gas in the primary reheater 17a of the parallel damper is increased (decreased) and the flow rate of gas in the primary superheater 16a and fuel economizer 15 is decreased (increased) to increase (decrease) the heat absorption in the primary reheater 17a and increase (decrease) the reheated steam temperature.

Figure 3:
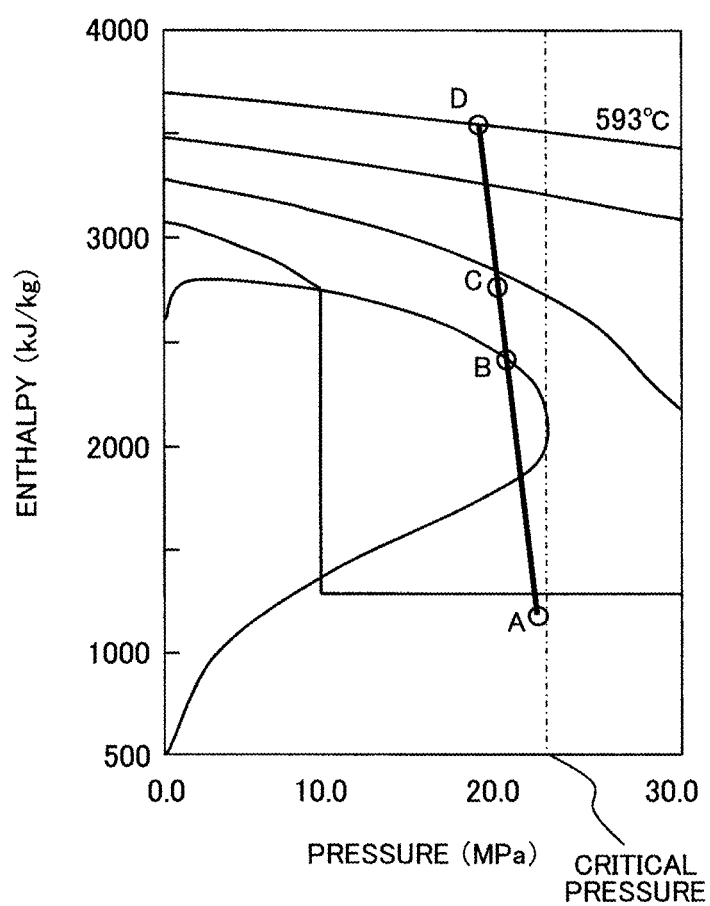
FIG. 3 shows pressure-enthalpy curves as characteristics of the first embodiment of the invention.

FIG. 3 shows how subcritical pressure high-temperature steam is generated according to the embodiment of the present invention. This figure shows pressure-enthalpy curves which visually illustrate generation of subcritical pressure high-temperature steam by the variable pressure operation once-through boiler in the subcritical pressure high-temperature steam power plant according to the embodiment of the present invention. The figure shows the line from feedwater point A at the inlet of the fuel economizer 15, to 593° C. at the outlet of the high-temperature superheater 16, for example, under the rated conditions of 16.6 MPa main steam pressure and 593° C. main steam temperature.

In the fuel economizer 15, after heating is done to the extent that steaming does not occur, heating (evaporation/superheating) is done by the spiral water wall tube 14 surrounding the furnace 13 of the boiler; after leaving the furnace 13 (spiral water wall tube 14), the temperature at point C is reached at the outlet of the steam separator 18. In the conventional drum boiler, the temperature at the drum outlet is kept low at point B, or the saturated temperature at the drum pressure, so heating is necessary to compensate for the temperature difference from point B to point D; however, for technical and economical reasons, the temperature can be increased only up to 566° C. In this embodiment, the high-temperature superheater 16 can increase the temperature from point C to point D (593° C.) and heating up to point D or 593° C. can be easily done without a substantial increase in the heat transfer area of the high-temperature superheater 16.

Figure 4:
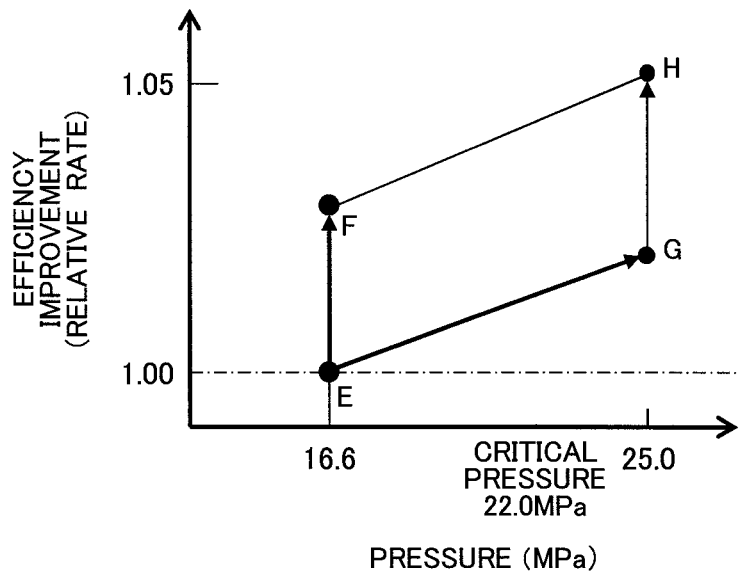
FIG. 4 shows the rate of efficiency improvement in the first embodiment of the invention.

FIG. 4 shows an example of efficiency improvement effect in the embodiment of the present invention. The figure shows the result of calculation of plant efficiency of rated output operation. Under the condition that the steam pressure in a coal fired thermal power plant is subcritical pressure less than the critical pressure (approx. 22.0 MPa), for example, 16.6 MPa, the calculated relative improvement rate of power generation efficiency is shown here on the assumption that point E where the main steam/reheated steam temperature is 538/538° C. is 1.00 (base).

In this embodiment (at point F where the steam pressure remains the same subcritical pressure and the steam temperature is 600/600° C.), a relative improvement rate of about 3% is expected. The efficiency improvement rate in this embodiment (point F) is expected to be higher than that at point G where the supercritical pressure is, for example, 25.0 MPa and the steam temperature is the same, or 538/538° C. In other words, when the steam pressure remains the same subcritical pressure and the steam temperature is increased to 600/600° C., the power plant efficiency is improved more effectively than when the steam temperature remains 538° C. and the pressure is increased, for example, from 16.6 MPa (subcritical pressure) to 25.0 MPa (supercritical pressure). Point H shows the efficiency improvement rate in the case that both the pressure and temperature are increased, for example, the steam pressure is 25.0 MPa (supercritical pressure) and the steam temperature is 600/600° C. However, even if the steam conditions at point H are applied to a small-to-medium capacity thermal power plant, efficiency cannot be improved as expected due to turbine internal loss as mentioned earlier. Although the steam temperature is 600° C. in this example, the efficiency improvement effect can be achieved in proportion to the temperature difference provided that the temperature is 593° C. or more.

Figure 5:
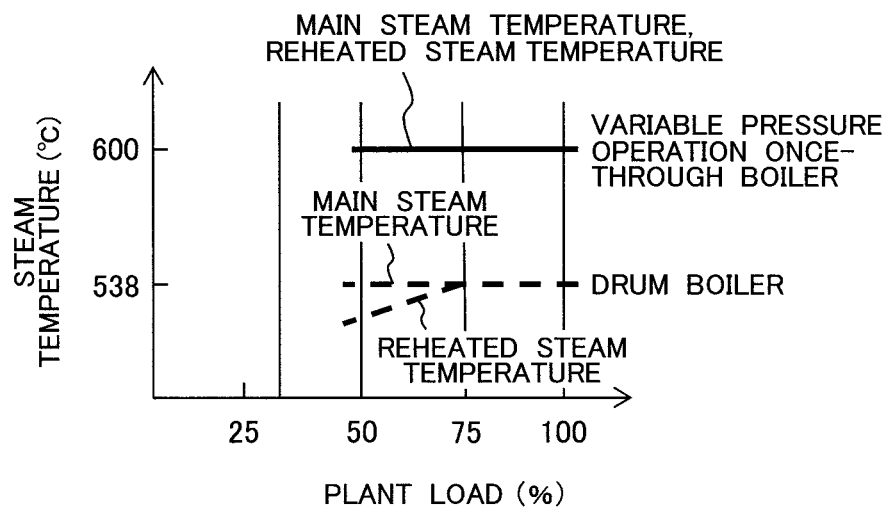
FIG. 5 shows the effect of steam temperature control in the first embodiment of the invention.

FIG. 5 shows the effect of steam temperature control in the embodiment of the present invention. The figure shows main steam and reheated steam temperature control characteristics in the plant partial load operating range in the subcritical pressure high-temperature steam power plant (subcritical pressure variable pressure operation once-through boiler) according to the embodiment of the present invention and in the conventional drum boiler thermal power plant (drum boiler).

In this embodiment, the range in which the steam temperature is held constant is wider than in the drum boiler and the plant efficiency is higher at the same partial load factor. More specifically, in this embodiment, the main steam/reheated steam temperature is controlled to be constant in the load factor range from 100% to 50% and the problem with the drum boiler that the reheated temperature tends to drop is solved and the plant power generation efficiency at partial load is expected to improve.

Figure 6:
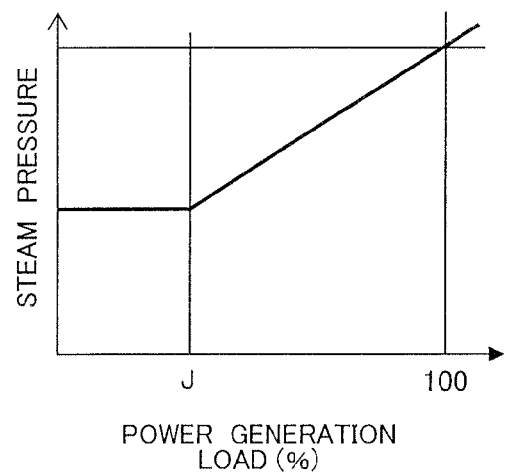
FIG. 6 shows an example of steam pressure control in the first embodiment of the invention.

FIG. 6 shows an example of steam pressure control in the embodiment of the present invention. The figure illustrates characteristics of change in main steam pressure during operation at partial load in the subcritical pressure high-temperature steam power plant according to the embodiment of the present invention. In this example, in the range from the plant high load region to minimum once-through load point J, variable pressure operation of the once-through boiler is performed with the main steam control valve 26 (shown in FIG. 1) open (virtually fully open) and in the load range below the minimum once-through load point J, constant steam pressure operation is performed by controlling the opening of the main steam control valve 26. The characteristics of change in main steam pressure during operation at partial load can also be realized by another variable pressure operation method which keeps the steam pressure at the rated level in the high load range based on the control technique of the main steam control valve called the nozzle governing method.

In the embodiment of the present invention, the weight of the furnace water wall or cage water wall is almost the same as in the drum boiler due to the smaller diameter of the water wall tube though it has a spiral structure. The weight of the superheater and reheater heat transfer tubes can be almost the same as in the drum boiler though the steam temperature is as high as 593° C. or more, because the variable pressure operation once-through boiler can make the steam, at the outlet of the steam separator at the furnace outlet, superheated steam of higher temperature than in the drum boiler. Since a drum as a weighty drum boiler component is not needed and weight saving equivalent to the drum weight minus the weight of the steam separator is achieved, the weight of the boiler body pressure part is expected to be about a little less than 10% smaller than that in drum boilers with the same plant power generation capacity.

In addition, since the variable pressure operation once-through boiler enables generation of sufficiently superheated steam in the furnace, a gas recirculation device or the like as a means for steam temperature control in a coal fired thermal power plant with a small-to-medium capacity can be omitted. This means that there is no recirculated gas and the amount of combustion gas is thus decreased and the weight and volume of the boiler can be smaller than those of a conventional drum boiler.

When a thermal power plant with a small-to-medium capacity using the existing subcritical pressure drum boiler is replaced, there are restrictions on the installation area and boiler weight in construction work. According to the embodiment of the present invention, as mentioned above, the new plant can be smaller than the existing plant, so replacement work can be done smoothly.

Figure 7:
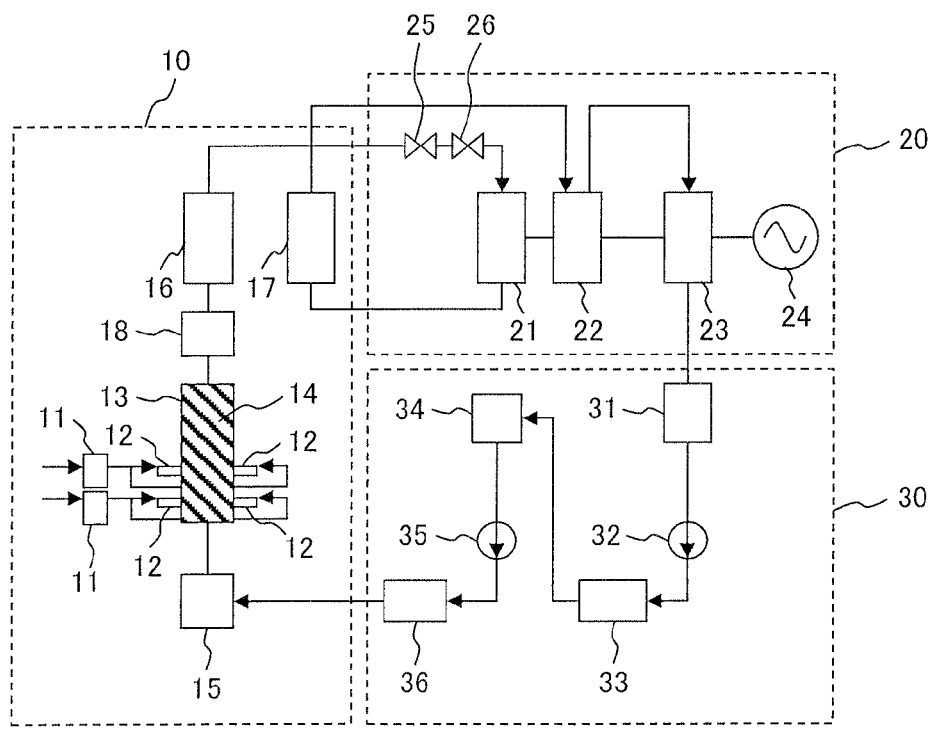
FIG. 7 is a schematic diagram showing the system configuration of a subcritical pressure high-temperature steam power plant according to a second embodiment of the present invention.

FIG. 7 is a schematic diagram showing the system configuration of a subcritical pressure high-temperature steam power plant according to a second embodiment of the present invention.

The basic configuration is the same as the subcritical pressure high-temperature steam power plant shown in FIG. 1, so descriptions of the same components as in the first embodiment are omitted here. A special feature of the second embodiment is the arrangement of burners which burn powdered coal as fuel supplied from the coal mill 11 in the furnace 13. Fuel is supplied from the same coal mill 11 to the burners 12 disposed in a row on both sides of the furnace 13. In the figure, two coal mill units are provided. Burners are arranged in two rows by two stages on opposite sides and fuel is supplied from each coal mill unit to a burner stage where fuel is distributed to the front and rear burners in the stage. Further, three coal mill units can be provided, and burners can be arranged in three rows by three stages on opposite sides and fuel is supplied from each coal mill unit to a burner stage where fuel is distributed to the front and rear burners in the stage. Due to this arrangement, powdered coal as fuel can burn so that unevenness in the temperature distribution in the furnace 13 and temperature differences in the metal temperature of the once-through spiral water wall tube 15 are reduced effectively.

The present invention can be applied to a subcritical pressure high-temperature steam power plant with a small-to-medium power generation capacity (0.1 to 0.4 million kW) which uses, as fuel, fossil fuel such as coal and heavy oil, biomass, or by-product gas of steel making process. Particularly the invention can be very effectively applied to the replacement or renovation of an existing coal fired thermal power plant. Coal fired thermal power plants with a small-to-medium capacity are used for industrial-use non-utility power generation facilities or by IPP (independent power production or power wholesaling business). Updating these power plants according to the present invention will contribute to efficiency improvement and reduction of $CO_2$ emissions. For example, if the invention is applied for the replacement or renovation of an old coal fired thermal power plant with a small-to-medium capacity using a drum boiler which has been used for more than 40 years, $CO_2$ emissions will be reduced 3 to 5% due to efficiency improvement made by increased steam temperature and the adoption of the latest technique for the steam turbine body.

The present invention is not limited to the above embodiments and includes other various forms of embodiments. For example, the above embodiments have been explained in detail for easy understanding of the present invention, but an embodiment of the invention need not include all the elements of the above embodiments. Some elements of an embodiment may be replaced by elements of another embodiment or elements of an embodiment may be added to another embodiment. Also, for some elements of an embodiment, addition of other elements, deletion or replacement is possible.

REFERENCE SIGNS LIST

10 . . . Combustion boiler system
11 . . . Coal mill
12 . . . Burner
13 . . . Furnace 14 . . . Spiral water wall tube
15 . . . Fuel economizer
16 . . . High-temperature superheater
16a . . . Primary superheater
16b . . . Secondary superheater
16c . . . Tertiary superheater
17 . . . High-temperature reheater
17a . . . Primary reheater
17b . . . Secondary reheater
18 . . . Steam separator
19 . . . Gas distribution damper
20 . . . Steam turbine generator system
21 . . . High-temperature high-pressure turbine
22 . . . High-temperature reheat intermediate-pressure turbine
23 . . . Low-pressure turbine
24 . . . Generator
30 . . . Condensate and feedwater system
31 . . . Condenser
32 . . . Condensate pump
33 . . . Low-pressure feedwater heater
34 . . . Deaerator
35 . . . Water supply pump
36 . . . High-pressure feedwater heater
A . . . Coal economizer inlet feedwater
B . . . Drum outlet steam
C . . . Steam separator outlet steam
D . . . High-temperature superheater outlet steam
E . . . 538/538° C.
F . . . 600/600° C.
G . . . 538/538° C.
H . . . 600/600° C.
J . . . Minimum once-through load

The invention claimed is:

1. A subcritical pressure high-temperature steam power plant comprising:
   a combustion boiler system;
   a steam turbine generator system; and
   a condensate and feedwater system,
   the subcritical pressure high-temperature steam power plant having a rated output in a range of 0.1 million kW to 0.4 million kW,
   the combustion boiler system including a high-temperature superheater configured to supply superheated steam with steam conditions of subcritical pressure and 593° C. or more, the subcritical pressure being 16.6 MPa or more, and a high-temperature reheater configured to supply reheated steam with steam conditions of 593° C. or more, and
   the steam turbine generator system including a high-pressure steam turbine provided with an initial blade cascade having a height and shape, the high-pressure steam turbine with the initial blade cascade being configured to be driven by the superheated steam with the steam conditions of subcritical pressure of 16.6 MPa or more and 593° C. or more and a reheat intermediate-pressure steam turbine to be driven by the reheated steam with the steam conditions of 593° C. or more.

2. The subcritical pressure high-temperature steam power plant according to claim 1, wherein the combustion boiler system is a powdered-coal combustion boiler which uses coal as main fuel and also a variable pressure operation once-through boiler which uses a boiler furnace water wall of a once-through spiral type.

3. The subcritical pressure high-temperature steam power plant according to claim 2, wherein the combustion boiler system burns biomass or by-product gas of steelmaking process with coal, as the fuel.

4. The subcritical pressure high-temperature steam power plant according to claim 2, wherein the combustion boiler system comprises a plurality of combustion burners arranged in a plurality of stages with combustion burners arranged on opposite sides in each stage and a plurality of coal mills each of which is provided for each of the stages and distributes fuel to the combustion burners arranged on opposite sides in each stage.

5. The subcritical pressure high-temperature steam power plant according to claim 2, wherein a spiral water wall tube constituting the furnace water wall is inclined 10 to 20 degrees from a horizontal direction.

* * * * *